Sept. 15, 1959  G. H. ROBERTS  2,903,776
CLAMP DEVICE
Filed Oct. 25, 1957
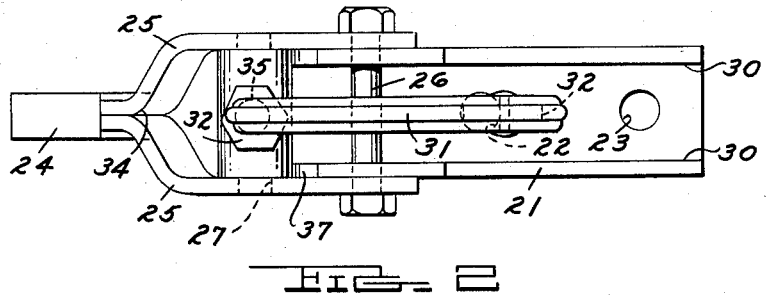
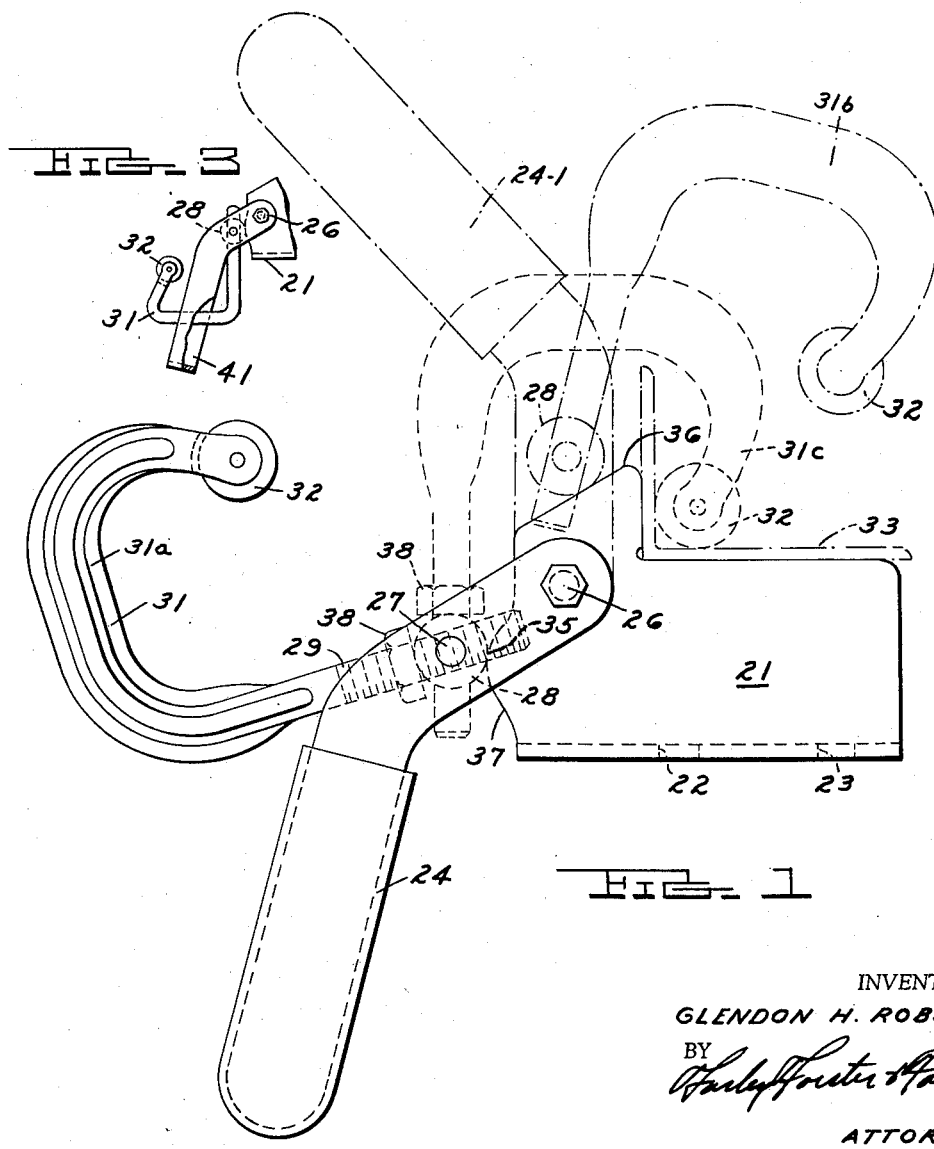
INVENTOR.
GLENDON H. ROBERTS
BY
ATTORNEYS

United States Patent Office

2,903,776
Patented Sept. 15, 1959

2,903,776

CLAMP DEVICE

Glendon H. Roberts, Grosse Pointe, Mich., assignor to Detroit Stamping Company, Detroit, Mich., a corporation of Michigan Application October 25, 1957, Serial No. 692,461

5 Claims. (Cl. 24—248)

This invention pertains to a clamp device and more particularly to a clamp for holding an angle section or other flanged member against a support. An embodiment of this invention has a handle which is pivoted to the support. An angle contacting member is pivoted to the handle in such a manner that when the handle is in the lower or actuated position, the clamping member is holding the angle firmly against the support. The support may be channel shaped with the contacting member movable between the support so that a three point support is made with the flanged member facilitating single clamping and/or clamping of curved flanged members. The clamping member is designed to contact the front of the flanged or angled member and be supported from the rear of the member so that in a release position, the member may be pivoted rearwardly completely freeing the clamping area. The clamp member preferably has a roller disc at its clamping terminal which engages the angle corner to hold it against the support. The clamp member pivot is preferably rotatable about the support pivot so that the pivots are alignable with the roller disc in a clamping operation to provide a toggle action in the closing or clamping movements of the handle. By placing the pivots on a line which is angularly disposed to the angle sides, pressure is exerted against each side in a clamping movement. By moving the handle to a release position, the clamp member, which may be hook shaped, may be pivoted away from the angle corner and toward the handle and then by moving the handle to its closed or actuated position, the hook is pivoted behind the angle and completely free of the clamping area to permit free removal of the flanged workpiece.

It is, therefore, an object of this invention to provide a clamp for flanged members which is completely removable from the clamping area in a simple pivoting motion.

It is a further object to provide such a tool having a toggle multiplication in the clamping movement of the handle.

It is another object to provide a roller disc for contacting the workpiece to prevent workpiece marring and lessen clamping effort.

Another object is to have the roller exert pressure on each of the angle sides.

These and other advantages and objects will become more apparent when a preferred embodiment is considered in connection with the drawings in which:

Figure 1 is an elevational view of a preferred embodiment showing the handle in two positions and the hook in three positions;

Figure 2 is a plan view of the embodiment shown in Figure 1; and

Figure 3 is a view of a second handle configuration.

In Figure 1 is seen support 21 which has holes 22, 23 for fastening to a bench or fixture, not shown, in order to securely hold a flanged member in desired position. A handle 24 is pivoted to support 21 at 26 with the limit of handle travel being shown at 24–1. Pivoted to handle 24 is a cylindrical spacer member 28 having reduced pivot ends 27 and a central threaded hole 35 for receiving threaded stem 29 of hook member 31. Hook member 31 is adjustable in the threaded hole of member 28 so that disc 32, which is rotatably mounted to the end of hook 31, may securely contact the inner sides of the legs of a flanged member 33. Hook 31 is movable from position 31a, where it is held by the juncture 34 of bifurcated ends 25 (Figure 2) of handle 24, to position 31c where it is shown holding disc 32 against a flanged member 33 in clamped relationship with support 21. In order to accommodate various flange thicknesses, arm 31 is adjustable relative member 28 by rotating threaded stem 29 in the threaded hole of member 28. Once the proper adjusted position is obtained, lock nut 38 may be turned against member 28. Support 21 has stop projections 36 against which member 28 acts to limit travel of handle 24 in the raised position 24–1. Projections 37 of support 21 act against member 28 to define the lower limit of travel of handle 24. When handle 24 is in the position 24–1, hook 31 may assume the position 31b.

In Figure 2 is seen the channel shape of support 21 with bifurcated handle ends 25 fitting against the outer sides 30 thereof and connected thereto by pivot 26. Member 28 is seen rotatably fitted between handle ends 25 and is shown carrying hook portion 31. In Figure 3 is shown the second embodiment of handle 24 which is separated along its entire length so that hook 31 may be pivoted between the handle sections 41 providing greater clearance for workpiece removal to the rear or handle side of support 21.

In the operation of the embodiment shown in Figure 1, the solid lines of handle 24 and hook 31 indicate the open position. Flanged workpiece 33 may be inserted on support 21 with no interference from a clamping member. Once the workpiece is properly placed on support 21 then handle 24 may be moved to position 24–1 where hook 31 will be at position 31b and will continue in the direction of the arrow in a clockwise pivot due to its own weight until disc 32 meets workpiece 33. Handle 24 may be moved from position 24–1 to its original position to move disc 32 leftwardly along the lower leg of workpiece 33 until it locks against the side of the flanged corner. The flanged member is supported by both upstanding legs or sides 30 and by disc 32 providing a three point support which permits stable clamping and clamping of curved flanged members. In the clamped position, pivots 26 and 27 lie along a line which is angularly disposed to each surface of workpiece 33 so that roller 32 exerts pressure on each surface adding to the stability of the clamp.

The provision of roller 32 at the end of arm 31 minimizes the marring of workpiece 33 especially during the final clamping action when the roller is being drawn under high pressure against the corner of the workpiece. By rolling over the workpiece surface, friction is reduced minimizing the clamping effort and tearing and weakening of the surface.

It is seen that during the last movement of the lock of clamping action a toggle force multiplication is obtained since a rather large handle movement or travel results in a relatively small travel of disc 32. This is evident since in the locked position disc 32, pivot 26, and pivot 27 are substantially aligned.

A feature of this invention is the rapidity with which the clamp may be applied. It is seen that by simply moving handle 24 to position 24–1, hook 31 will automatically fall to a position along the lower leg of workpiece 33 so that by lowering handle 24, a toggle action is provided for clamping the flanged member. A raising and lowering of handle 24 is all that is necessary in the clamping action. To release flanged member 33, handle 24 is raised to position 24–1 where hook 31 is lifted to position 31b and pivoted backwardly along with handle 24 to move it free of the clamping area.

A further feature of this invention is that support 21 may comprise a standard component of a fixture and then by forming a hole for pivot 26, handle 24, with hook clamp 31, may be pivoted to the fixture to provide a clamping assembly. This reduces manufacturing, shipping and storage costs and increases the flexibility of use since the handle and clamp combination may be moved from fixture to fixture with only one pivot to change. Also, since clamp 31 is adjustable relative to handle 24, the same handle and clamp combination may be used on a wide range of fixture sizes.

While a preferred embodiment of this invention has been described above in detail, it will be understood that numerous modifications may be resorted to without departing from the scope of the following claims.

I claim:

1. An assembly for clamping flanged members comprising a support having angularly related sides, a handle member being in pivotal relation to said support, and a flanged member engaging means pivotally connected to said handle for engaging the sides of the flanged member to urge said flanged member against the angularly related sides in a clamping area, said engaging means being pivotable away from the included area between said angularly related sides to completely free the included and clamping area providing for unobstructed removal of said flanged member, said handle comprising laterally separated side members, said engaging means being pivotable between said side members, and said side members being separated along a sufficient length to provide clearance for said engaging means so that said means may be pivoted through said handle side members.

2. An assembly for clamping flanged members comprising a support having angularly related sides, a handle member being in pivotal relation to said support, and a flanged member engaging means pivotally connected to said handle for engaging the sides of the flanged member to urge said flanged member against the angularly related sides in a clamping area, said engaging means being pivotable away from the included area between said angularly related sides to completely free the included and clamping area providing for unobstructed removal of said flanged member, said handle comprising separated side members meeting at a juncture, and said engaging means being pivotable between said side members and registerable with said juncture when pivoted away from said included area so that on pivoting toward said included area said engaging means will be pivoted by its own weight toward the flanged member.

3. An assembly for clamping flanged members comprising a support having angularly related sides, a handle member being in pivotal relation to said support, a flanged member engaging means pivotally connected to said handle for engaging the sides of the flanged member to urge said flanged member against the angularly related sides in a clamping area, said engaging means pivotable away from the included area between said angularly related sides to completely free the included and clamping area providing for unobstructed removal of said flanged member, and stop means associated with said handle and registerable with said engaging means to provide a stop for said engaging means when pivoted away from said included area so that on pivoting toward said inclined area said engaging means will be actuated by its own weight toward said flanged member.

4. A handle and clamp combination adapted for use with a support having angular support surfaces to clamp a flanged member comprising a handle member adapted for pivotal connection with the support, and engaging means pivotally connected to said handle and adapted for engaging the sides of the flanged member in a clamping area, said engaging means adapted for pivoting away from the included area between the angular support surfaces and flanged member to completely free the included and clamping area providing for unobstructed removal of the flanged member, said handle member comprising laterally separated side members, said engaging means being pivotable between said side members, and said side members being separated along a sufficient length to provide clearance for said engaging means so that said means may be pivoted through said handle side members.

5. A handle and clamp combination adapted for use with a support having angular support surfaces to clamp a flanged member comprising a handle member adapted for pivotal connection with the support, and engaging means pivotally connected to said handle and adapted for engaging the sides of the flanged member in a clamping area, said engaging means adapted for pivoting away from the included area between the angular support surfaces and flanged member to completely free the included and clamping area providing for unobstructed removal of the flanged member, said handle member comprising separated side members meeting at a juncture, and said engaging means being pivotable between said side members and registerable with said juncture when pivoted away from said included area so that on pivoting toward said included area said engaging means will be pivoted by its own weight toward the flanged member.

References Cited in the file of this patent

UNITED STATES PATENTS

| | | |
|---|---|---|
| 2,550,365 | McKenzie | Apr. 24, 1951 |

FOREIGN PATENTS

| | | |
|---|---|---|
| 6,801 | Great Britain | Dec. 14, 1911 |
| 570,627 | Great Britain | July 16, 1945 |
| 581,670 | Great Britain | Oct. 21, 1946 |